(12) United States Patent
Meier Zu Farwig et al.

(10) Patent No.: US 11,964,532 B2
(45) Date of Patent: Apr. 23, 2024

(54) CHASSIS COMPONENT, METHOD FOR PRODUCING A CHASSIS COMPONENT, AND WHEEL SUSPENSION FOR A MOTOR VEHICLE

(71) Applicant: ZF Friedrichshafen AG, Friedrichshafen (DE)

(72) Inventors: Jonas Meier Zu Farwig, Belm (DE); Alexander Lundberg, Melle (DE); Michael Klank, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 382 days.

(21) Appl. No.: 17/258,499

(22) PCT Filed: Jul. 9, 2019

(86) PCT No.: PCT/EP2019/068407
§ 371 (c)(1),
(2) Date: Jan. 7, 2021

(87) PCT Pub. No.: WO2020/030366
PCT Pub. Date: Feb. 13, 2020

(65) Prior Publication Data
US 2021/0276384 A1 Sep. 9, 2021

(30) Foreign Application Priority Data
Aug. 10, 2018 (DE) .................... 10 2018 213 513.4

(51) Int. Cl.
*B60G 7/00* (2006.01)
*B60G 17/019* (2006.01)

(52) U.S. Cl.
CPC ....... *B60G 7/001* (2013.01); *B60G 17/01941* (2013.01); *B60G 2204/1162* (2013.01);
(Continued)

(58) Field of Classification Search
CPC .............. B60G 7/001; B60G 17/01941; B60G 2204/1162; B60G 2206/7101;
(Continued)

(56) References Cited

U.S. PATENT DOCUMENTS 4,478,091 A * 10/1984 Forrester .............. B60G 17/019
177/136
5,880,542 A * 3/1999 Leary ..................... H10N 35/00
310/26

(Continued)

FOREIGN PATENT DOCUMENTS

DE 10 2011 010 367 A1 8/2012
DE 10 2014 214 827 A1 2/2016
(Continued)

OTHER PUBLICATIONS

German Office Action Corresponding to 10 2018 213 513.4 dated Aug. 31, 2021.
(Continued)

*Primary Examiner* — Paul N Dickson
*Assistant Examiner* — Timothy Wilhelm
(74) *Attorney, Agent, or Firm* — Finch & Maloney PLLC

(57) ABSTRACT

A chassis component (1) for a wheel suspension having at least two pivot points (3, 4), at least one connecting structure (7) which interconnects the pivot points (3, 4) with one another, and at least one sensor (9). The at least one sensor (9) is embodied as a piezoresistive thin film (19) arranged on a section of a surface (8) of the connecting structure (7). A thin film interconnects contact points (15, 16), of at least two conductive sections (13, 14) which are integrated in the connecting structure (7), to one another.

15 Claims, 2 Drawing Sheets

(52) U.S. Cl.
CPC ........... *B60G 2206/7101* (2013.01); *B60G 2206/8101* (2013.01); *B60G 2400/64* (2013.01); *B60G 2401/10* (2013.01); *B60G 2401/26* (2013.01)

(58) Field of Classification Search
CPC ........ B60G 2206/8101; B60G 2400/64; B60G 2401/10; B60G 2401/26; B60G 2204/202; B60G 2206/81; B60G 2400/60; B60G 2206/11; B60G 2206/8112; B29L 2031/3055; B29C 70/882; B29C 70/72; B29C 70/06; B60Y 2400/30
See application file for complete search history.

(56) References Cited

U.S. PATENT DOCUMENTS

| | | | | |
|---|---|---|---|---|
| 5,927,699 | A * | 7/1999 | Nakajima | F16F 15/023 267/140.13 |
| 6,023,574 | A * | 2/2000 | Tangren | G11B 5/4833 703/2 |
| 6,050,126 | A * | 4/2000 | Miyazaki | G01L 5/1627 73/11.07 |
| 6,164,119 | A * | 12/2000 | Miyazaki | G01L 5/1627 73/11.07 |
| 6,254,114 | B1 * | 7/2001 | Pulling | F16C 7/026 403/135 |
| 6,286,895 | B1 * | 9/2001 | Urushiyama | B62D 21/152 188/371 |
| 6,474,162 | B1 * | 11/2002 | Voss | G01C 19/5614 73/504.16 |
| 6,688,618 | B2 * | 2/2004 | Schmidt | F16F 15/005 280/124.108 |
| 7,083,199 | B2 * | 8/2006 | Graber | F16F 1/366 280/5.507 |
| 7,089,199 | B2 | 8/2006 | Gräber et al. | |
| 8,169,311 | B1 * | 5/2012 | Breed | B60R 21/01536 340/539.22 |
| 8,381,601 | B2 * | 2/2013 | Stumpf | G01D 15/00 73/777 |
| 9,452,657 | B1 * | 9/2016 | Giaier | B60Q 1/08 |
| 9,517,676 | B2 * | 12/2016 | Schmierer | F16F 7/116 |
| 9,610,818 | B2 * | 4/2017 | Mark | F16F 1/3849 |
| 9,683,907 | B2 * | 6/2017 | Takeuchi | G01L 9/0052 |
| 9,816,880 | B2 * | 11/2017 | Hofmann | B60G 7/001 |
| 10,379,654 | B2 * | 8/2019 | Li | G01B 7/18 |
| 10,816,415 | B2 * | 10/2020 | Choi | B60C 23/064 |
| 10,981,424 | B2 * | 4/2021 | Mainz | B60G 7/001 |
| 11,364,762 | B2 * | 6/2022 | Hadi | B60G 11/27 |
| 2003/0160414 | A1 * | 8/2003 | Pincerato | B60G 7/001 280/93.51 |
| 2006/0273530 | A1 * | 12/2006 | Zuber | B60G 21/052 280/124.13 |
| 2012/0292871 | A1 * | 11/2012 | Wittmann | B60G 21/0551 280/124.106 |
| 2019/0265015 | A1 * | 8/2019 | Michiwaki | G01B 7/16 |
| 2021/0138864 | A1 * | 5/2021 | Palafox | B60G 17/01908 |

FOREIGN PATENT DOCUMENTS

| | | |
|---|---|---|
| DE | 10 2016 224 719 A1 | 6/2018 |
| JP | 2018-089621 A | 6/2018 |
| WO | 03/039894 A1 | 5/2003 |

OTHER PUBLICATIONS

International Search Report Corresponding to PCT/EP2019/068407 dated Oct. 24, 2019.
Written Opinion Corresponding to PCT/EP2019/068407 dated Oct. 24, 2019.

* cited by examiner

CHASSIS COMPONENT, METHOD FOR PRODUCING A CHASSIS COMPONENT, AND WHEEL SUSPENSION FOR A MOTOR VEHICLE

This application is a National Stage completion of PCT/EP2019/068407 filed Jul. 9, 2019, which claims priority from German patent application serial no. 10 2018 213 513.4 filed Aug. 10, 2018.

FIELD OF THE INVENTION

The invention relates to a chassis component for a wheel suspension, with at least two pivot points, at least one connecting structure which connects the pivot points to one another, and at least one sensor.

BACKGROUND OF THE INVENTION

In addition, the invention relates to a method for producing a chassis component, wherein the chassis component is made with at least two pivot points and a connecting structure made of at least one fiber composite material, and the chassis component is provided with at least one sensor. Finally, an object of the invention is also a wheel suspension for a motor vehicle with at least one chassis component as aforesaid.

WO 03/039894 A1 describes a chassis component which is in particular a control arm for a wheel suspension. The control arm consists of fiber-reinforced plastic or fiber composite systems, such that in the plastic parts of the control arm a sensor in the form of a strain gauge or a piezo-element is integrated in order to measure forces applied to the chassis component.

DE 10 2014 214 827 A1 describes a chassis component for a wheel suspension, which has two pivot points that are connected with one another by a connecting structure. The chassis component is made from a fiber-plastic composite structure, in which a sensor is integrated, which sensor detects a change of the fiber composite structure. For this, the sensor integrated in the fiber-plastic composite structure can be connected to an evaluation device.

The integration of the sensor in the chassis component as in the prior art requires that the sensor, to be connected to the evaluation device, is provided with leads which can be attached in various ways on the surface of the chassis component. For example, the leads can be connected to the sensor by means of a soldered joint. Further connection options include the application of a conductive paint such as silver paint or the adhesive bonding of flexible conductive foil. Besides the necessary time-consuming preparation measures for creating the prerequisites for soldering or for the paint application or bonding, durability is not achieved especially when a conductive paint is used.

SUMMARY OF THE INVENTION

Starting from the above-described prior art, it is now the purpose of the present invention to provide a chassis component characterized by simpler design, which can be produced more simply and inexpensively.

From the device standpoint this objective is achieved, starting from the independent claim(s), in combination with the characterizing features thereof. From the standpoint of method, the objective is achieved starting from the preamble of the independent claim(s), in combination with its characterizing features. The dependent claims that follow in each case describe advantageous further developments of the invention. Furthermore, a wheel suspension in which at least one control arm according to the invention is used, is also the object of the independent claim(s).

According to the invention, a chassis component for a wheel suspension is proposed, which comprises at least two pivot points, at least one connecting structure that connects the pivot points to one another, and at least one sensor. At each pivot point, a ball joint and/or a rubber mounting can be provided. The sensor serves to recognize a change of the fiber composite structure of the chassis component and/or to detect loads or overloads or even overstrains. By continuously monitoring the forces occurring in the chassis component, fatigue related phenomena can be recognized at an early stage.

The invention is based on the technical principle that the at least one sensor is arranged on a section of a surface of the connecting structure, wherein the sensor connects to one another contact points of at least two conductive sections integrated in the connecting structure. Such a design has the advantage that elaborate and time-consuming preparation of the surface of the connecting structure can be omitted in order to produce an electrically conducting connection between the sensor and the conductive sections. Thanks to their integration in the connecting structure of the chassis component, the conductive sections are protected against external influences and are durably held in position. The conductive connection of the contact points is achieved by the sensor, which is arranged on the surface of the chassis component where the stresses in the chassis component due to extension, compression and torsion are the highest.

In this case the at least one connecting structure can consist of a fiber composite material. Preferably, the at least one connecting structure is made from a thermosetting short-fiber-plastic composite, preferably from a glass-fiber-reinforced plastic (GRP). Alternatively, the connecting structure can be made from a plastic which is not electrically conductive.

Preferably, the at least one sensor is in the form of a piezo-resistive thin film arranged on a section of the surface of the connecting structure.

To protect it from external influences the piezo-resistive thin film can be provided with a protective coating. In particular, the protective coating can enclose the thin film in a watertight manner. Moreover, it is advantageous if the material of which the protective coating consists is elastic, so that deformations of the chassis component will not result in detachment from the surface. Furthermore, the protective coating can provide protection against impacts and splitting. The piezo-resistive thin film can be covered or enclosed by the material of the connecting structure. In particular, the protective coating is made from the same material as the connecting structure.

Preferably, in the area of the sensor, in particular the sensor in the form of a piezo-resistive thin film, the connecting structure can have at least one connector at which connection points of the connecting sections are accessible from the outside. This makes it possible in a simple way to connect a lead in order to transmit signals detected by the sensor, i.e. the sensor in the form of a piezo-resistive thin film, to an evaluation device. For this purpose the connector can be in the form of a coupling with which a plug of the lead can be connected with interlock.

According to a preferred embodiment the piezo-resistive thin film can be in the form of a paint layer of a piezo-resistive material. The paint layer can be applied during the production process after the conductive sections have been cast in place, or after the end of the production process of the chassis component. Here, it is particularly advantageous that the paint layer can be applied on the surface of the connecting structure by pouring or spraying. Alternatively, the paint layer can be applied by a squeegee, by printing, or by sputtering. In particular, the piezo-resistive thin film forming the paint layer can comprise of a polymer paint.

To detect the loading of the chassis component, the sensor, in particular the piezo-resistive thin film, can extend in the longitudinal direction and/or the principal stress direction of the at least one connecting structure. Particularly with a chassis component that has more than two connection points, several relevant stress directions may have to be taken into account, in which the piezo-resistive thin film can extend. It is also conceivable to provide a further sensor in the form of a piezo-resistant thin film, which can be arranged at an angle to the longitudinal axis of the chassis component.

According to an advantageous further development, the conductive sections can be in the form of stamped grids or wires. This enables inexpensive production of the conductive sections.

Preferably, the chassis component can be in the form of a control arm. In that case it can be a two-point control arm which connects two pivot points to one another, or a three-point or multi-point control arm. Alternatively, the chassis component can be a pendulum support, a wheel carrier or a leaf spring. Preferably, the chassis component is in the form of a supporting hinge or a support bearing, in particular for a damper.

In addition, to achieve the objective set at the start a method for producing a chassis component in accordance with the independent claim(s) is proposed.

According to the independent claim(s), a method for producing a chassis component is proposed, wherein the chassis component is made with at least two pivot points and at least one connecting structure made of plastic or at least a fiber composite material. In particular, the plastic or fiber composite material is not electrically conductive. The chassis component is provided with at least one sensor by means of which a change of the fiber composite structure of the chassis component is recognized and/or loads or overloads or even overstrains are detected. For this, in the production process of the connecting structure at least two conductive sections are integrated in the connecting structure, such that contact points of the conductive sections emerge on the surface of the connecting structure and are connected with one another by a sensor. In particular, the sensor is arranged on the surface of the connecting structure.

Preferably, the conductive sections are in the form of stamped grids or wires. Before the production of the connecting structure the conductive sections can be placed in a die for producing the connecting structure and/or positioned in the die. By means of a casting and/or injection molding process the connecting structure can be made with the conducive sections integrated in it.

In particular, the sensor is in the form of a piezo-resistive thin film. For that, the piezo-resistive thin film forming the sensor can be cast or sprayed onto a section of the connecting structure. By virtue of the casting or spraying, the process is simplified compared with the prior art.

It is advantageous for at least one connector to be formed on the surface of the connecting structure. In that case the connector is arranged close to the sensor. The number of connectors corresponds to the number of sensors cast onto a section of the connecting structure.

Particularly preferably, a wheel suspension comprises one or more chassis components formed according to the invention, which can be designed as control arms for the wheel suspension.

BRIEF DESCRIPTION OF THE DRAWINGS

An advantageous embodiment of the invention, which is described below, is illustrated in the drawings, which show.

DETAILED DESCRIPTION OF THE PREFERRED EMBODIMENTS

Figure 1:
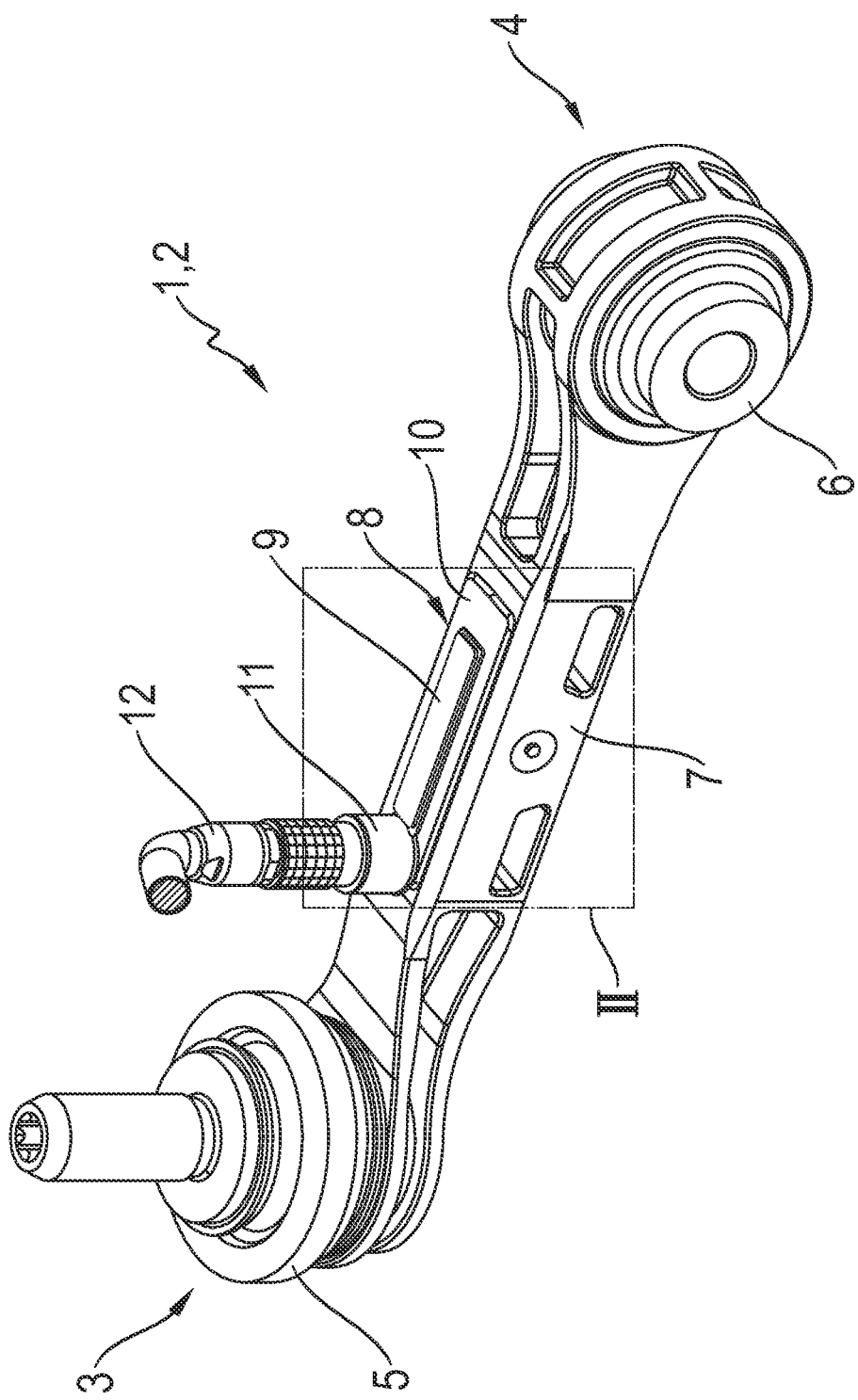
FIG. 1: A perspective view of a chassis component in the form of a control arm.

FIG. 1 shows a perspective view of a chassis component 1 in the form of a control arm 2. It can be seen that the control arm 2 is in this case a two-point control arm with two pivot points 3 and 4, wherein at the pivot point 3 a joint in the form of a ball joint 5 is provided and at the pivot point 4 a joint in the form of a rubber mounting 6 is provided.

The control arm 2 consists of a fiber-plastic composite and comprises at least one connecting structure 7, which extends between the pivot points 3 and 4 and is composed of a thermosetting, continuous-fiber plastic composite, in particular GRP.

On one surface 8 of the connecting structure 7 there is arranged a sensor 9, of which only a protective coating 10 is shown. The sensor 9 serves to recognize a change of the fiber composite structure of the chassis component 1 and/or to detect loads or overloads or even overstrains.

In addition, on the surface 8 is arranged an essentially hollow-cylindrical connector 11. The connector 11 is preferably arranged close to the sensor 9. In this case, the connector 11 can be designed in a form of a coupling to which a plug 12 of a lead can be connected with interlock. By way of the lead, signals from the sensor 9 can be transmitted to an evaluation device for evaluation.

Figure 2:
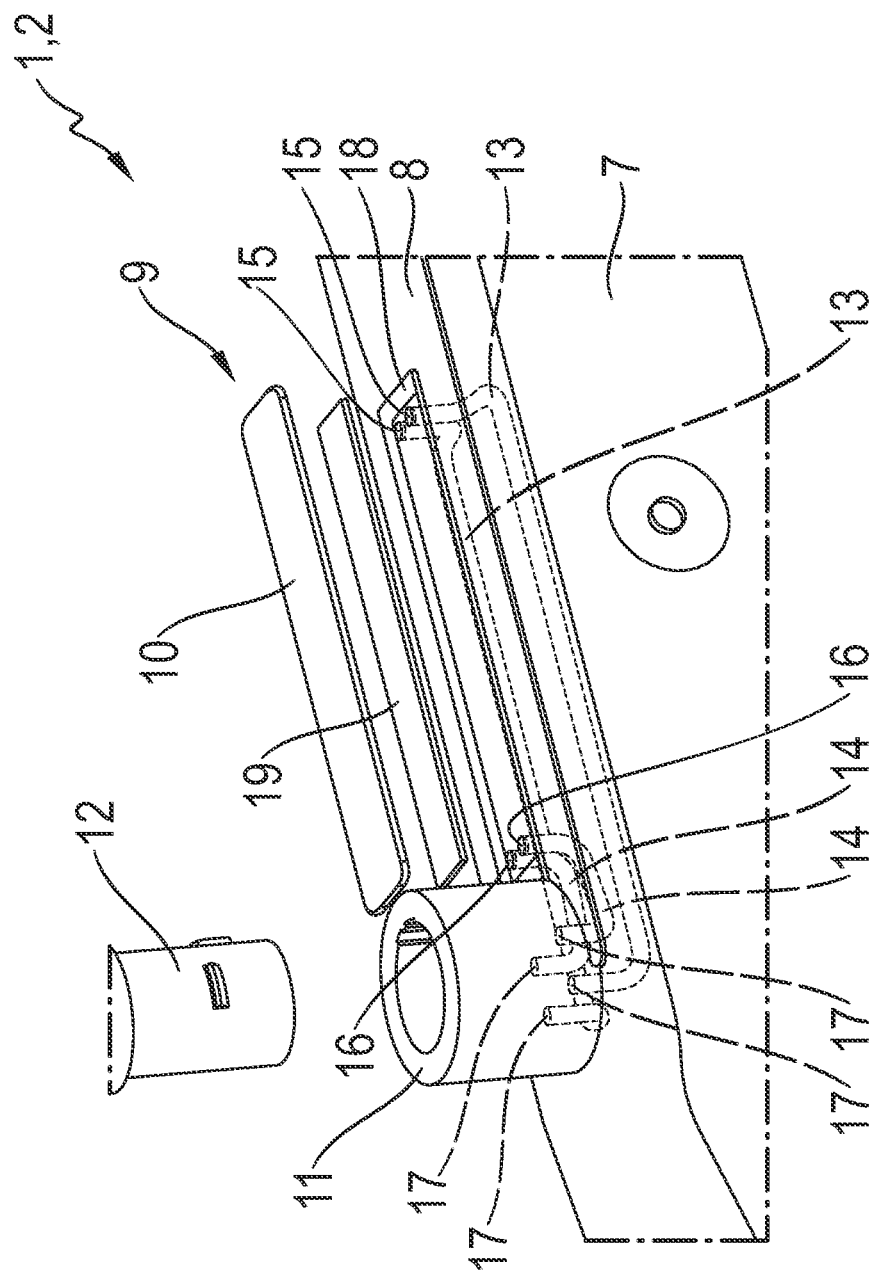
FIG. 2: A partial, exploded view of the chassis component.

The illustration in FIG. 2 shows a partial, exploded view of the chassis component 1. The control arm 2 is represented as partially transparent, so that components integrated in it are made visible. The elements integrated in the connecting structure 7 are conductive sections 13 and 14 respectively arranged in pairs, which extend in sections in the longitudinal direction of the connecting structure 7 under its surface 8. Each conductive section 13, 14 has at one end a contact point 15 and 16 respectively. The contact points 15 and 16 emerge onto the surface 8 a distance apart from one another and at points of the connecting structure 7 opposite one another.

For the production of the connecting structure 7 made as a shaped plastic component, for example by the resin transfer molding process, the ball joint 5, the rubber mounting 6 and the conductive sections 13, 14 are positioned in a die in order to integrate those elements in the structure 7.

In the example embodiment shown, an essentially rectangular recess 18 is provided, at one end area of which the contact points 15 of the conductive section 13, and at the opposite end of which the contact points 16 of the conductive section 14 emerge at the surface 8. The contact points 15, 16 end essentially flush with the surface 8 inside the recess 18. At the other end of the conductive sections 13, 14 there is in each case a connection point 17, which leads into the connector 11. The contact points can project above the surface 8 into the connection 11. The conductive sections 13, 14 can preferably be in the form of stamped grids or wires. During the production of the control arm 2, the conductive sections 13, 14 are integrated in the connecting structure 7, in that they are almost completely overmolded. Only the contact points 15, 16 and the connection points 17 are left free.

The sensor 9 is in the form of a piezo-resistive thin film 19, which forms a conductive connection of the oppositely arranged contact points 15 and 16 of the conductive sections 13, 14 to one another.

For example, the piezo-resistive thin film 19 can be applied onto the surface 8 or into the recess 18 by pouring or spraying. The protective coating 10 is then applied over the thin film 19 in order to protect it from external influences. The depth of the recess 18 can be chosen such that at least the piezo-resistive thin film 19 ends almost or actually flush with the surface 8 surrounding the recess 18. The protective coating 10 applied over the piezo-resistive thin film 19 serves to enclose it in a watertight manner. Furthermore, it is advantageous if the material of which the protective coating 10 is formed is elastic, so that deformations of the chassis component 1 at the surface 8 do not give rise to detachment. Moreover, the protective coating 10 can provide protection against impacts and splitting.

The application of the piezo-resistive thin film 19, as well as the integration of the conducive sections 13, 14, can be included in the production process of the connecting structure 7.

INDEXES

1 Chassis component
2 Control arm
3 Pivot point
4 Pivot point
5 Ball joint
6 Rubber mounting
7 Connection structure
8 Surface
9 Sensor
10 Protective coating
11 Connector
12 Plug
13 Conductive section
14 Conductive section
15 Contact point
16 Contact point
17 Connection point
18 Recess
19 Piezo-resistive thin film

The invention claimed is:

1. A chassis component, for a wheel suspension, comprising:
    at least two pivot points,
    a connecting structure connecting the two pivot points to one another, the connecting structure having an outer surface,
    at least two conductive sections, each of the conductive sections having contact points, the conductive sections are integrated into the connecting structure such that only contact points of the conductive sections emerge at the outer surface of the connecting structure,
    at least one sensor being formed as a piezo-resistive thin film,
    the piezo-resistive thin film being poured or sprayed onto a section of the outer surface of the connecting structure such that the sensor connects the contact points of the conductive sections to one another.

2. The chassis component according to claim 1, wherein the connecting structure comprises a fiber composite material.

3. The chassis component according to claim 2, wherein the fiber composite material is a glass-fiber reinforced plastic.

4. The chassis component according to claim 1, wherein the piezo-resistive thin film is provided with a protective coating or is covered or surrounded by a material of the connecting structure.

5. The chassis component according to claim 4, wherein in an area of the piezo-resistive thin film, the connecting structure comprises at least one connector by way of which connection points of the conductive sections are accessible from an outside, the connection points being formed by contact points of the conductive sections that project from the outer surface of the connecting structure.

6. The chassis component according to claim 4, wherein the piezo-resistive thin film is in a form of a paint coating of a piezo-resistive material.

7. The chassis component according to claim 6, wherein the paint coating comprises a polymer paint.

8. The chassis component according to claim 4, wherein the piezo-resistive thin film is provided with the protective coating, the protective coating is elastic and encloses the piezo-resistive thin film in a water tight manner.

9. The chassis component according to claim 1, wherein in an area of the sensor, the connecting structure comprises at least one connector by way of which connection points of the conductive sections are accessible from an outside, the connection points being formed by contact points of the conductive sections that project from the outer surface of the connecting structure.

10. The chassis component according to claim 1, wherein the sensor is a piezo-resistive thin film and extends in at least one of a longitudinal direction and a principal stress direction of the chassis component.

11. The chassis component according to claim 1, wherein the conductive sections are in a form of stamped grids or wires.

12. The chassis component according to claim 1, wherein the chassis component is one of a control arm, a pendulum support, a wheel carrier or a leaf spring.

13. A wheel suspension for a motor vehicle, comprising at least one chassis component according to claim 1.

14. A method for producing a chassis component so that the chassis component has at least two pivot points and a connecting structure, the connecting structure is made from a plastic or at least a fiber composite material, and the chassis component is provided with at least one sensor, the method comprising:
    integrating at least two conductive sections in the connecting structure in such a manner that only contact points of the at least two conductive sections emerge at an outer surface of the connecting structure and are connected to one another by a sensor,
    forming the sensor as a piezo-resistive thin film, and
    pouring or spraying the piezo-resistive thin film onto a section of the connecting structure.

15. The method according to claim 14, further comprising forming a connector on the outer surface of the connecting structure.

* * * * *